United States Patent [19]

Chandler et al.

[11] 3,912,970

[45] Oct. 14, 1975

[54] ELECTRON BEAM DEFLECTION CORRECTION SYSTEM

[75] Inventors: James F. Chandler, Chicago; Wayne R. Chiodi, Northbrook; Raymond C. Figlewicz, Park Ridge; Steven Karlovics, Darien, all of Ill.

[73] Assignee: Zenith Radio Corporation, Chicago, Ill.

[22] Filed: June 8, 1973

[21] Appl. No.: 368,142

[52] U.S. Cl. .................................. 315/370; 335/213
[51] Int. Cl.$^2$ .......................................... H01J 29/56
[58] Field of Search ......... 315/27 GD, 27 R, 27 TD, 315/27 XY, 370, 371, 13 C; 335/210–213

[56] References Cited

UNITED STATES PATENTS

| | | | |
|---|---|---|---|
| 3,368,095 | 2/1968 | Jannery | 335/213 |
| 3,714,500 | 1/1973 | Kaashoek | 315/27 GD |
| 3,735,189 | 5/1973 | Karlovics | 315/27 GD |
| 3,793,554 | 2/1974 | Rossaert | 315/27 XY |

*Primary Examiner*—Maynard R. Wilbur
*Assistant Examiner*—J. M. Potenza
*Attorney, Agent, or Firm*—Nicholas A. Camasto; Roy A. Ekstrand

[57] ABSTRACT

A color television receiver is of the type which includes a cathode ray tube having an image screen composed of luminescent dot triads distributed in a raster pattern. Each triad has dots individually productive of respective red, green and blue colors. An electron gun produces a delta array of three electron beams to excite respectively assigned ones of the dots on the screen. Two of the electron beams are aligned in the horizontal direction while the third is displaced in the orthogonal direction. The usual yoke assembly is provided on the neck of the cathode ray tube for producing horizontal and vertical scanning fields that deflect the beams over the raster pattern in order to define the image. At the same time, the yoke assembly introduces astigmatic distortion in the electron beam array as the beams are deflected toward edges of the raster. Also included is a system which tends to maintain convergence of the electron beams upon the dot triads throughout action of the deflection means. To compensate the astigmatic distortion, at least the third beam is subjected to a pair of correcting fields that are spaced opposed in the horizontal direction on opposite sides of the third beam and serve mutually to aid movement of that third beam in the orthogonal direction; in most embodiments, the correcting fields also act upon the other two beams. The correcting fields are developed in response to a waveform which includes at least a component that varies parabolically at the rate of change of the horizontal scanning field; ideally, the waveform also includes a parabolic component that varies at the vertical scanning rate. Together, the correcting fields function as a dynamic purity control.

7 Claims, 12 Drawing Figures

ELECTRON BEAM DEFLECTION CORRECTION SYSTEM

BACKGROUND OF THE INVENTION

The present invention relates to color television receivers. More particularly, it pertains to systems included in a color television receiver for compensating astigmatic distortion present in the electron beam scanning system.

A conventional image reproducer in a color television receiver includes an electron gun assembly for projecting three beams in a delta array through a perforated shadow mask to a luminescent screen over which phosphor dot triads are distributed in a pattern. The electron gun assembly is mounted within the neck of a generally funnel-shaped envelope which flares outwardly from the neck until it merges into a faceplate upon which the luminescent screen is formed. Situated on the neck at the beginning part of the flared portion is a deflection yoke which produces periodically-varying scanning fields that cause the beams to be swept over the image screen in a raster pattern. Also mounted on the neck in a location behind the deflection yoke is a convergence assembly for subjecting the beams individually to respective different parabolically-varying fields which serve in operation to maintain a constant angle of convergence between the different beams as they are deflected throughout the scanning pattern. In addition, the convergence assembly includes permanent magnets that are manually adjustable in order to afford a static convergence control. Still another component mounted on the neck is a purity control often in the form of a pair of magnetized rings positioned near the cathode plane. The rings are magnetized generally along their respective diameters and during set up may be manually rotated so as to develop a combined field transverse to the electron beams which serves to adjust the paths of the different beams so that each beam lands only on phosphor dots of its assigned color of reproduction.

In the typical color cathode ray tube, the luminescent screen is composed of a pattern of phosphor dot triads with each phosphor individually being productive upon electron beam excitation of respective red, green and blue light. Consequently, it is customary for convenience to refer to the corresponding electron guns as the red gun, the green gun and the blue gun. Similarly, it is convenient to speak in terms of the red, green and blue electron beams. In the usual delta array of the electron guns, it is common practice to space the red and green guns apart in the horizontal direction so as to define the two corners of the delta base, while the blue gun is displaced upwardly in the orthogonal direction to the base so as to define the top corner of the delta. The three guns thus form an equilateral triangle the center of which lies on the tube axis. When assembled, the guns are mechanically converged so that their individual electron beams are coincident at the shadow mask and thus are in registration with the assigned phosphors in the dot triads at the center of the image screen.

It is well known that a variety of registration errors may be encountered either in the manufacture or in the operation of this kind of image reproducer. During manufacture, errors may arise by reason of deficiencies in the photo-mechanical printing process utilized to apply the phosphor dots to the faceplate. In operation, such errors arise by reason of undesired deviations in the beam paths so that the beams do not land at their assigned spots on the image screen. One previously recognized cause of improper beam landings on the phosphor dot triads is the presence of astigmatic distortion in the raster-scanning deflection field. The amount and direction of the astigmatism varies with deflection of the beams away from the center of the raster toward its edges. As the extreme positions of horizontal deflection, referred to as the three and nine o'clock positions, the most pronounced distortion in the beam triad is in the vertical direction; the term "beam triad" refers to the triangle defined by the three electron beams. On the other hand, at the six and twelve o'clock positions of maximum vertical deflection, the dominant distortion is an elongation in the horizontal direction. In either case, the amount of astigmatism, and thus the degree of distortion, is a function of deflection angle. Such astigmatic distortion has posed an increasing problem with the use of greater deflection angles such as those encountered in the so-called 110° cathode ray tube.

In many cases, astigmatic distortion of the kind described is most troublesome at the three and nine o'clock positions whereat the blue beam suffers a substantial vertical displacement often referred to as "blue droop". One suggestion for compensating blue droop is to modify the process for photomechanically printing the image screen so that the phosphor dot triads are intentionally distorted in shape in order to match the astigmatic distortion in beam landing positions. Of course, this introduction of a second distortion just to compensate a first not only complicates the manufacture of the tube but also requires that the latter then always be matched to a particular kind of deflection system and specifically one which has not been designed so as to be free of astigmatism.

It is believed to be more attractive to compensate astigmatic distortion by other means. One system for this purpose is disclosed in copending application Ser. No. 126,026, filed March 19, 1971 (R699) in the name of Kazimir Palac and assigned to the same assignee as the present application. In one approach using that system, the desired compensation is obtained by utilizing four coils wound around the conventional ferrite flux concentrator or core associated with the deflection yoke. The coils are spaced successively apart by 90° and are oriented so that, when energized by dynamic correction signals of horizontal and vertical frequencies usually derived from the dynamic convergence system, a quadrapole correction field is produced within the deflection region that has its poles aligned on the so-called diagonals to the horizontal and vertical scanning axes. Alternatively, the quadrapole field may be produced by use of appropriate taps or other windings on the yoke windings. In any event, the quadrapole field effects blue droop compensation at the three and nine o'clock screen positions and also compensates an inverse blue compression which exists at the six and twelve o'clock position. However, a problem of undesired co-deflection is encountered. Another prior system employs a deflection yoke wound so that it does not produce astigmatism on the horizontal or vertical axes. However, complex circuitry then is required to achieve correction of astigmatism in the corners and the problem of co-deflection is still troublesome. While all the foregoing systems have been demonstrated, they each suffer for one reason or another by reason of undesired complexity and cost.

OBJECTS OF THE INVENTION

It is, accordingly, a general object of the present invention to provide a new and improved system for compensating astigmatic distortion which overcomes the deficiencies of prior approaches such as those described above.

One particular object of the present invention is to provide a new and improved system for compensating astigmatic distortion which does not require the introduction of any further distortion in the image reproducer.

Another particular object of the present invention is to provide a new and improved system for compensating astigmatic distortion which minimizes the amount of additional structure required in association with the image reproducer.

A specific object of the present invention is to provide an electromagnetic system for compensating astigmatic distortion which does not require the winding or tapping of any coils on the yoke structure itself.

A still further object of the present invention is to provide a system for dynamically correcting the purity of the electron beams in a tri-beam color image reproducer.

SUMMARY OF THE INVENTION

A color television receiver in accordance with the present invention thus includes a cathode ray tube which has an image screen composed of luminescent dot triads distributed in a raster pattern. Each triad has dots individually productive of respective red, green and blue colors. A triad of three electron beams is produced for the purpose of exciting respectively assigned ones of the dots; two of those beams are aligned in one direction while the other is displaced in the orthogonal direction. Scanning fields are developed so as to deflect the beams over the raster pattern in order to define an image. At the same time, however, astigmatic distortion is introduced in the beam triad as the beams are deflected toward edges of the pattern. Also included are means which tend to maintain convergence of the beams throughout the action of the deflection means. For the purpose of compensating the astigmatic distortion, the receiver further includes means for subjecting at least the other beam, in the region of the scanning fields, essentially only to a pair of correcting fields that are space-opposed on opposite sides of that other beam in the one direction. The correcting fields mutually aid movement of the other beam in the orthogonal direction. Finally, there are means for energizing the subjecting means with energy which at least includes a component that varies parabolically in aamplitude at the rate of change of the scanning field in the one direction.

BRIEF DESCRIPTION OF THE DRAWINGS

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIGS. (*a*, 9*b* and 9*c* are plots illustrating a preferred manner of utilizing multi-polar coil assemblies effective in the deflection-field region for the purpose of compensating astigmatic distortion.

DESCRIPTION OF THE PREFERRED EMBODIMENT

Figure 1:
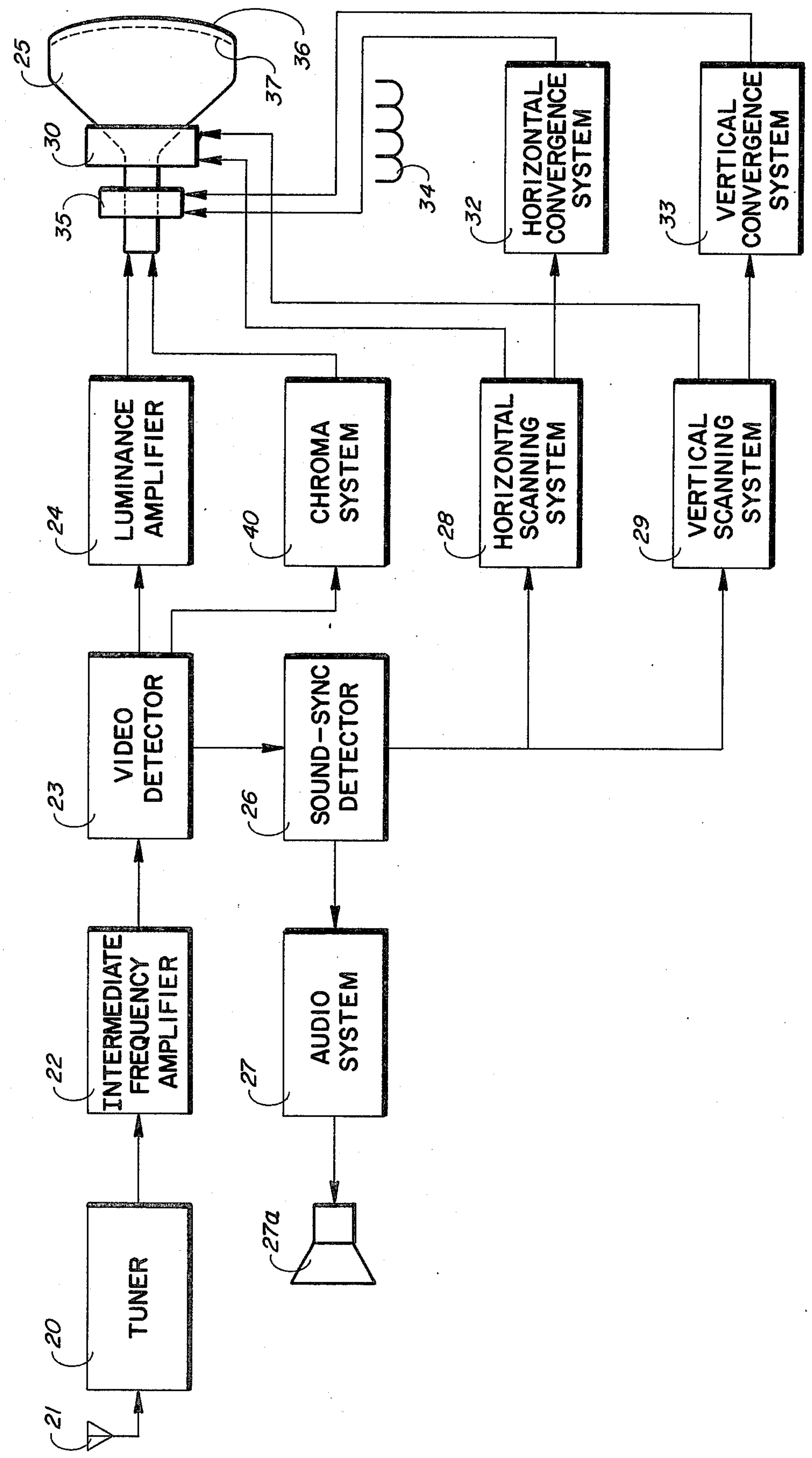
FIG. 1 is a block diagram of a color television receiver.

FIG. 1 illustrates, with certain simplifications not essential to an understanding of the present invention, the various different stages or systems which together constitute one form of a conventional color television receiver. Thus, a tuner 20 selects a composite television signal in a desired channel received by an antenna 21. Employing the usual superheterodyne technique, tuner 20 converts the signal frequencies in the range of whatever channel is selected to a constant frequency range, and those converted signals are fed to an intermediate frequency amplifier 22. The amplified intermediate frequency signals are then fed to a video detector 23 which develops and supplies a video amplifier 24 with a brightness or luminance video signal. The latter, in turn, is fed to one control input of an image reproducer 25.

A portion of the signal in video detector 23 also is fed to a sound-sync detector 26 from which an audio signal is derived and amplified by an audio system 27 and fed to a sound reproducer 27*a*. Detector 26 serves still further by extracting synchronizing information from the detected video signals and feeding such information to a horizontal scanning system 28 and also to a vertical scanning system 29. Scanning systems 28 and 29 develop respective deflection signals which are fed to a deflection yoke 30 mounted on the neck of cathode ray tube 25. A portion of the horizontal and vertical scanning information also is fed to respective ones of a horizontal convergence system 32 and a vertical convergence system 33. The latter two systems produce corresponding convergence waveforms, of repetitive parabolic shape as indicated at 34, which are fed to a convergence yoke assembly 35 for the purpose of subjecting each of the three different electron beams projected through the neck of tube 25 individually to respective different convergence fields that serve to maintain convergence throughout deflection of the beams by action of the deflecting fields to which the beams subsequently are subjected by yoke 30. Convergence assembly 35 also includes the usual permanent magnets individually associated respectively with each of the different electron beams for the purpose of enabling a static convergence adjustment. Cathode ray tube 25 is of the type having an image screen 36 composed of luminescent dot triads distributed in a raster pattern with each such triad having dots individually productive of respective red, green and blue colors. The electron gun assembly in the rear portion of the neck of tube 25 produces a delta array of three electron beams that excite respectively assigned ones of the triad dots after selective passage through a perforated shadow mask 37 spaced parallel to and slightly behind image screen 36.

Also included in the receiver is a chroma system 40 which responds to hue, saturation and color-reference information fed from detector 23 in order to develop color-representative signals that are supplied as additional inputs to image reproducer 25. Typically, chroma system 40 includes amplifiers of the chroma content together with a demodulator which derives and develops the color-representative signals.

As so far described, the receiver of FIG. 1 is entirely conventional. Of course, it will be understood to include the usual additional features that have been found to be desirable. For example, manually adjustable controls are provided for the viewer so that he may selectively adjust such functions as volume, brightness, contrast, tone of the sound and hue and saturation of the color. In addition, the receiver includes circuitry for automatically controlling or stabilizing such functions as intermediate-frequency gain and frequency, horizontal and vertical scanning rates, chroma amplitude and the frequency and phase of chroma demodulation. The implementation and operation of such controls and functions are well known and form no part of the subject matter to which the present description is particularly directed.

Figure 2:
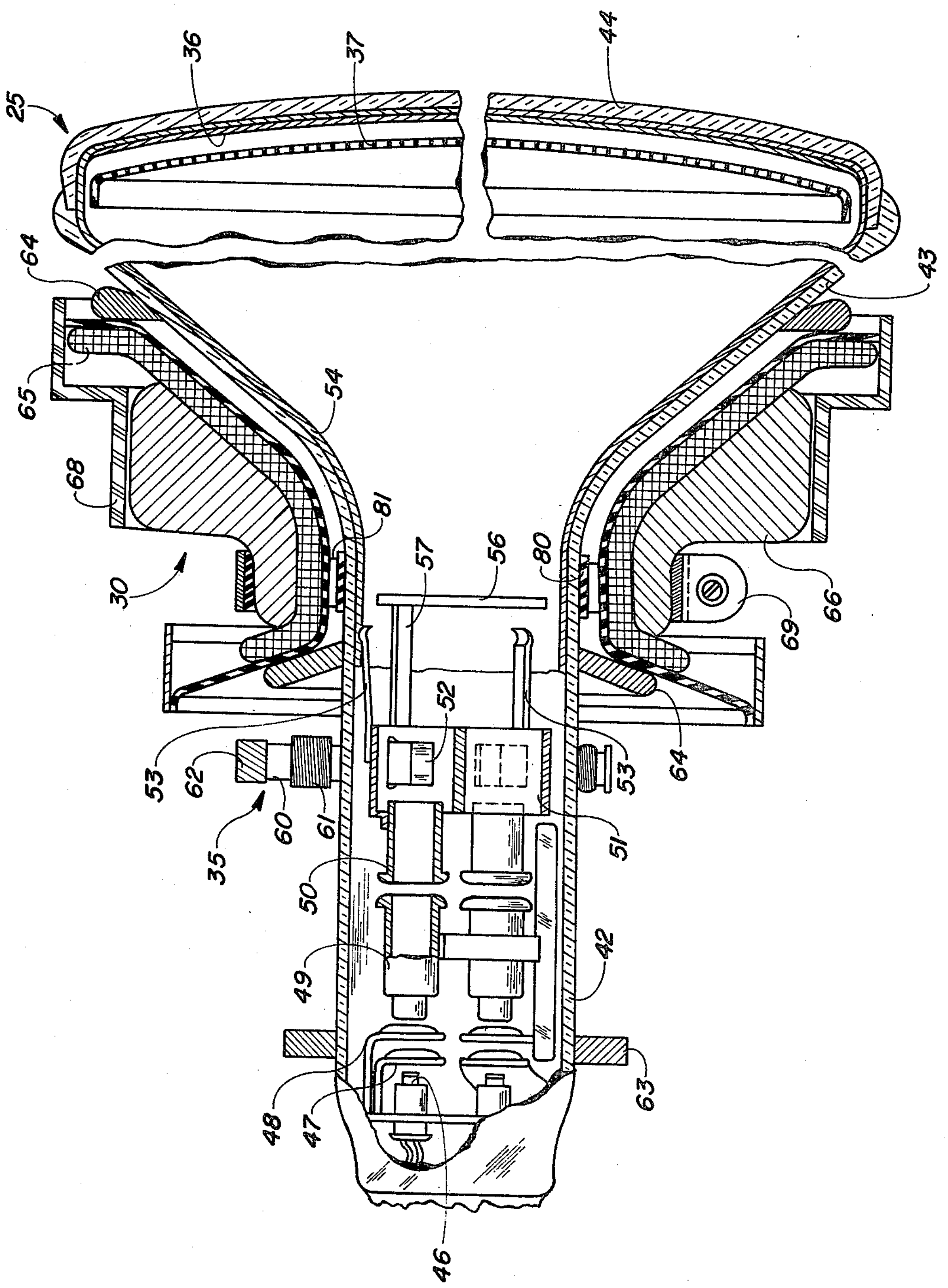
FIG. 2 is a cross-sectional view of a color image reproducer upon which various deflection and correction components are mounted.

As shown in FIG. 2, image reproducer or cathode ray tube 25 is in itself entirely conventional. Its envelope thus includes a neck 42 which flares outwardly into a bell-shaped portion 43 that is frit-sealed around the perimeter of a faceplate 44. Within neck 42 is an assembly of three electron guns arranged to project a delta array or triad of electron beams through mask 37 to luminescent screen 36. Each electron gun includes a cathode 46 followed by a control grid 47, an accelerated anode 48 and a focusing grid 49. Following the latter is a final anode 50 joined to a succeeding convergence pole assembly 51 that includes the usual Y-shaped magnetic shield which serves to define three partitioned chambers in which the convergence fields produced by convergence yoke 35 operate. Structure 51 includes convergence pole pieces 52. Projecting forwardly from the convergence assembly of the electron gun are snubber springs 53 which engage a graphite conductive coating 54 extending from neck 42 along the entire inside of flared portion 43 to faceplate 44 and which serves as an extension of the final accelerating anode. Also shown in FIG. 2 is a getter 56 supported by a stem 57 from the structure of shield 51.

The elctron gun assembly produces three electron beams with the red and green electron guns being in a common horizontal plane while the blue electron gun is disposed in a vertical plane which bisects the plane between the other two guns. The electron guns are adjusted so as mechanically to converge the beams at the mask, thus forming an equilateral beam-landing triangle at the center of screen 36. The dimensions and orientation of that triangle are selected so that, with purity and static convergence magnets properly adjusted, the beam landing positions are in registration with the phosphor dot triad on which they impinge at that location. Luminescent screen 36 in itself is composed of a regularly repeating raster pattern of the phosphor dot triads within each of which are dots of green, blue and red phosphors. Shadow mask 37 is formed and positioned so that it achieves color selection such that, with the deflection center of yoke 30 properly positioned, each beam lands only on phosphor dots of the color which it is intended to excite.

As indicated, dynamic convergence is achieved by means of convergence yoke 35. In a conventional manner, a U-shaped magnetic core 60 is disposed externally of neck 42 in a position over each of the respective electron beams. Series-connected coils 61 on each leg of that core are energized with parabolic waveforms repeating at the horizontal and vertical frequencies for the purpose of correlating the convergence fields to the deflection angles and thereby tending to maintain convergence throughout scanning of the raster pattern by the beams. Each of cores 60 also is associated with a permanent magnet disc, inserted mechanically and magnetically in series with the core path, which may be adjusted so as to achieve convergence of the undeflected beams. While but one coil 61 is illustrated in FIG. 62 as being located on the leg of core 60, the usual practice is to employ separate coils on each leg assigned respectively to the horizontal and vertical convergence currents.

Also mounted on neck 42, in a position approximately over the plane defined by the active ends of cathodes 46, is a purity magnet assembly 63. The latter produces a static field across the beam paths that is adjustable in intensity and direction for the purpose of varying the angles at which the beams are incident upon mask 37. This is conventionally known as the purity adjustment.

Deflection yoke 30 also is itself entirely conventional. Thus, it includes a pair of opposing saddle-shaped horizontal deflection coils 64 accompanied by a pair of similarly opposing quadrature-oriented vertical deflection coils 65. Encircling the deflection coils is a ferrite core 66. The latter and the deflection coils are secured within a housing 68, of plastic or other non-magnetic material, the entire assembly being held in place by a clamping ring 69.

Figure 3:
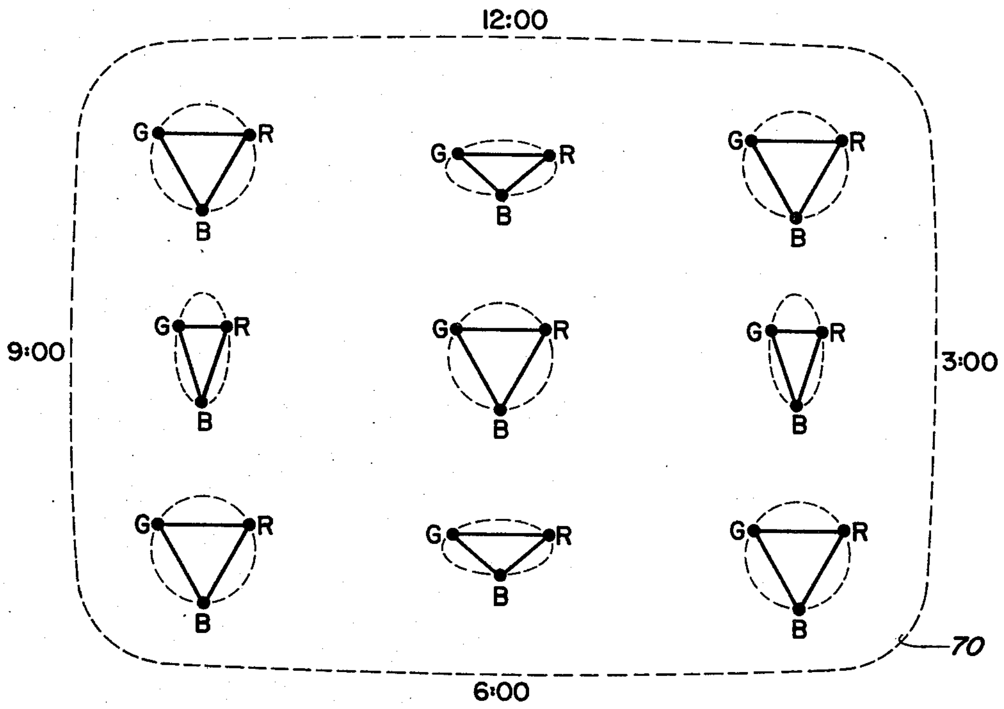
FIG. 3 is a diagram which illustrates, in exaggerated form, effects of scanning-field astigmatic distortion upon electron beam landing positions.

Again as so far described, the color image reproducer illustrated in FIG. 2 is entirely conventional. Deflection yoke 30 functions in operation to develop scanning fields that deflect the three electron beams over the raster pattern of the luminescent dot traids. However, and particularly at deflection angles in excess of 90°, the scanning fields developed by the yoke introduce or exhibit astigmatic distortion in the delta array of the beams as a result of which the beam triads occur in other than patterns of equilateral triangles. This is illustrated in FIG. 3 wherein the dashed outline 70 represents the periphery of the image screen while the various circles and elipses depict the beam triads at different locations within the scan of the image raster. According to convention, different ones of those locations are adjacent to the three, six, nine and twelve o'clock perimeter positions. In addition, beam triads on the so-called diagonals are shown at the respective different corners of the image screen. Of course, the size of each beam triad as shown in FIG. 3 is greatly exaggerated for purpose of illustration.

Figure 4:
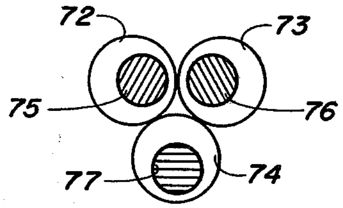
FIG. 4 illustrates an effect of error in beam landing position as related to phosphor dot location on an image screen.

Inspection of FIG. 3 reveals little or no distortion of the desired equilateral-triangle arrays of the beam triads at the center and at the four corners of the image raster. However, at the three and nine o'clock positions, there is substantial drooping of the blue beam accompanied by some compression in the horizontal direction of the green and red beam positions. At the six and twelve o'clock locations, on the other hand, a compression or raising of the blue beams, relative to the green and red beams, occurs together with some expansion or spread of the space between the green and red beams. In operation, the distorted beam triads may still have good landings. However, correction of convergence then results in distortion of the landings as shown in FIG. 4 with respect to either of the three or nine o'clock locations. That is, an equilateral triangle is defined by a green dot 72, a red dot 73, and a blue dot 74. At the same time, the corresponding beam landing positions are indicated by the respective cross-hatched areas 75, 76 and 77. At the six and twelve o'clock locations, on the other hand, the red and green landings are near the outer edges of their assigned dots and the blue beam is near the top of its dot. Such distortions occur because the convergence correction takes place at other than the deflection center of the yoke.

As specifically shown in FIG. 4, all three beams, even though their landing positions have been distorted, still land within their assigned phosphor dot areas so that faithful color reproduction may result. In a typical case, that has been the result when using a cathode ray tube having a 90° deflection angle. At 110°, however, the blue beam is found to land partially off the blue dot. In any event, it is clear with reference to FIG. 4 that any further displacement of the blue beam in position 77 will result in discoloration. Similarly, the fact that each of beam landing positions 75–77 have been distorted so that they have been moved nearer to the edge of the respective phosphor dots mean that all related tolerances for achieving faithful color reproduction have been reduced.

Analogous problems exist when there is an inverse size relationship between the phosphor dots and the beam landing areas. That relationship, for example, is employed in the currently successful so-called black-surround image screens as described and claimed in U.S. Pat. No. 3,146,368, issued Aug. 25, 1964 and assigned to the same assignee of the present application. Whatever the luminescent screen formation may be in a triad-type display approach, the ultimate aim is to achieve alignment between the phosphor dot triads and the beam landing triads. The astigmatic distortion in the deflection fields here under consideration serves to reduce the tolerances available for achieving faithful color reproduction, whether the contributing cause of such error lies in the formation of the luminescent screen or in the actual operation of either the deflection or the covergence fields.

Figure 5:
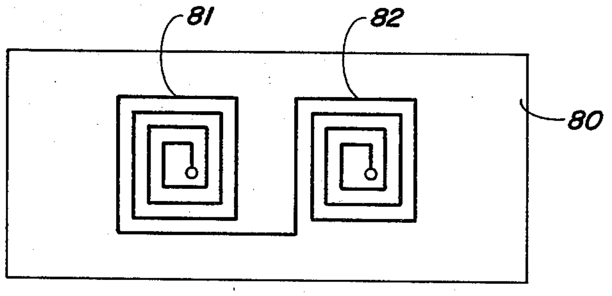
FIG. 5 is a plan view of a coil assembly useful in accordance with the present invention.

To the end of simply but adequately attaining compensation of the astigmatic distortion introduced in the delta array of the electron beams by the deflection fields, at least the blue beam is subjected to an additional dynamically varying field. This field corrects triad astigmatism so that the purity, or beam landing positions on the luminescent screen, remains good when convergence is corrected. This additional correcting field is produced at least near, and preferably within, the region occupied by the deflection or scanning fields. Most simply, the correcting field is developed by a pancake-shaped coil arrangement sandwiched between deflection yoke 30 and neck 42 of the cathode ray tube. In more detail, FIG. 5 depicts a thin-flexible strip of insulating material 80 upon which is printed, by thin-film techniques, a pair of coils 81 and 82 each having one terminal for connection to an external source of energy and having their other terminals commonly connected so that, in use, the two coils produce two individual fields which are in series-bucking relationship. Strip 80 is wrapped around neck in a position between the envelope of the tube and horizontal deflection coils 64. Of course, the exposed surfaces of coils 81 and 82 are coated with a thin film of lacquer or other insulating material so as to insure against electrical contact with the windings of deflection coil 64 which also are insulatingly coated.

The sleeve thus formed by strip 80 is oriented so that coils 80 and 82 are spaced-opposed on opposite sides of the blue beam as viewed in the horizontal direction. In a simplified version, the connecting teminals of coils 81 and 82 are merely connected into horizontal convergence system 32 so as to be in series with the blue beam-convergence coil and thus conduct energy that varies parabolically in amplitude at the rate of change of the horizontal scanning or deflection fields. In a practical system, it has been found that use of the horizontal parabola alone affords sufficient compensation that purity error is correctible within the tolerances available. That is, blue beam error is substantially overcome. At the same time, there also is a small amount of correction, in the right direction, on the red and green beams. Ideally, however, the waveform supplied to coils 81 and 82 is a combination of vertical-rate parabola added to the horizontal-rate parabola. The relative amplitudes are selected so as to afford essentially zero compensation at the four corners and the center of the luminescent screen. At six and twelve o'clock, it causes the blue beam to be moved downwardly, while at three and nine o'clock that beam is moved upwardly.

As further background, it may be noted that, during production, the phosphor dots of the luminescent screen in the cathode ray tube are deployed so that any beam deflected at the deflection center will approach the shadow mask at the proper angle to produce good beam landing. That is, beam landing or purity is a function of the angle at which the beam is incident on the mask. Convergence, on the other hand, is determined by where the beam strikes the screen. As already mentioned, astigmatism, and its relationship to the screen geometry, causes beam triad distortion. However, purity in itself remains proper, because the angles of the beams at the mask continue to be correct as long as deflection occurs at the design deflection center. On the other hand, action of the convergence yoke is necessary to correct the beam position. That correction, in turn, causes the blue beam angle at the mask to be too shallow. The end result is that the apparent purity, or beam landing, at the screen is in error.

In compensation of the ultimate purity distortion or error, the net correcting field produced by coils 81 and 82 effects an additional dynamically varying bend in at least the blue beam so as to achieve both proper position (convergence) and proper mask angle (purity). In principle, the correcting field may be located toward the cathodes from both the convergence and deflection yokes. However, that approach tends to effect deterioration of focus and requires large convergence yoke current. As shown in FIG. 2, coils 81 and 82 preferably are located beneath the rear edge of the deflection yoke so as to be only slightly behind the deflection center. In this location, the correcting field complements the blue beam convergence field so that less current is required to produce the latter. ideally, the astigmatism correcting field might be located exactly at the deflection center so as to vary beam position with no effect on beam angle at the mask. However, this requires a more expensive cone-shaped pancake coil. As a still further alternative, it also is possible to locate the correcting field somewhat forward of the deflection center, although that approach encounters even further cost by reason of the flare of the tube envelope. In any event, coils 81 and 82 develop a combined correcting field which mutually aids element of at least the blue beam in the appropriate direction and in an amount which is proportional to the angle of deflection and of a value to compensate the astigmatism.

Figures 6, 7, 8, 9A, 9B, 9C, 10:
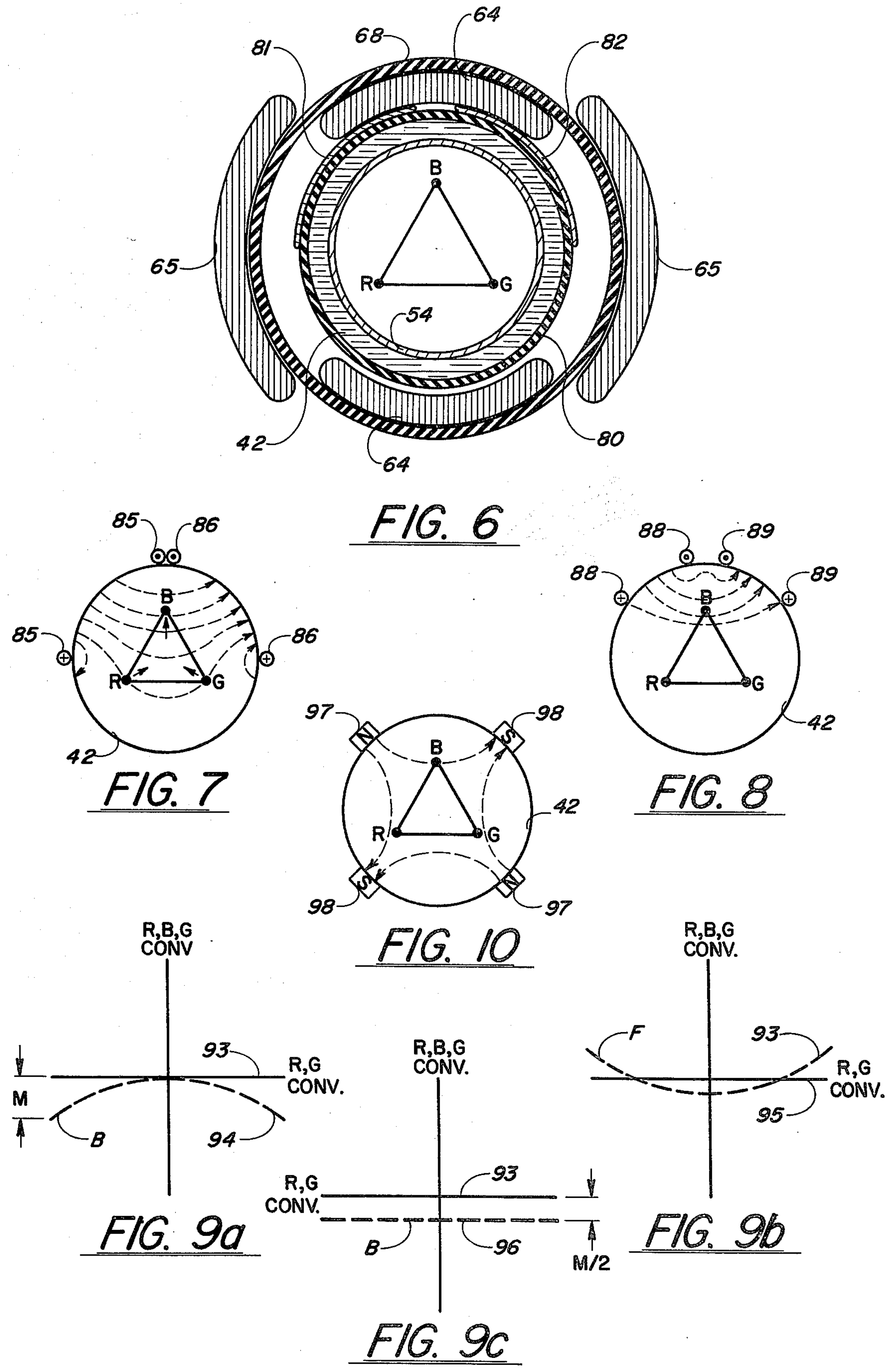
FIG. 6 is a cross-sectional view taken transversely through a deflection yoke mounted upon the neck of a color image reproducer and also including the coil assembly of FIG. 5.
FIGS. 7 and 8 schematically represent different alternatives to the coil assembly of FIG. 5.
FIG. 10 schematically illustrates the poles developed by a still different coil assembly.

At least in principle, correction coils 81 and 82 need only be constituted of a pair of single loops 85 and 86 as schematically depicted in FIG. 7. The plus and dot signs shown within the conductors of those loops indicate the direction of relative current flow so as to create the bucking relationship between the two different individual correcting fields which combine to effect creation of the ultimate correcting field. A shown in FIG. 7, the respective ones of the two correcting coils each spans approximately ninety degrees of the circumference of neck 42, respectively on opposite sides of the blue beam. The resulting effective magnetic distribution is represented by the dashed lines, and the consequent direction of compensatory beam movement at the moment illustrated is represented by the small arrows. Thus, the primary effect is upon the blue beam, because it lies near the region of greatest field strength. It will be observed, however, that the compensating field also has a desired, although lesser, compensatory effect upon the red and green beams.

In many cases, a lesser degree of span is sufficient. Thus, an approximate 45° span, to either side of the blue beam, is illustrated for correcting coils 88 and 89 in FIG. 8. With that arrangement, only a comparatively short length of simple printed coil, so thin as to be received between the yoke and the neck of the cathode ray tube, has been shown to be sufficient to accomplish adequate compensation of the astigmatic distortion introduced by the deflection yoke.

Operation as thus far described has been successfully demonstrated under conditions in which convergence yoke 35 is operated entirely in its conventional manner to apply horizontal and vertical synamic convergence fields to all three beams. In an alternative mode of operation, the horizontal hynamic convergence portion of yoke 35 assigned to the blue beam is omitted. Operation in this mode is illustrated in FIGS. *9a—9c* which represent the conditions of red, blue and green convergence error in the vertrical direction as against amount of deflection in the horizontal direction. Thus, in FIG. *9a* the straight horizontal line 93 depicts a satisfactory condition of red and green convergence (proper red and green beam landing positions), while dashed line 94 curves downwardly in the direction toward each horizontal scanning extreme so as to indicate the presence of blue droop. FIG. *9b* includes a curve 95 which represents the dynamically varying field produced by the combined action of correcting coils 81 and 82 or 88 and 89. It will be observed that, with respect to the vertical direction, the correcting field is of a shape generally reciprocal to that of the amount of blue droop represented by curve 94. The result of applying the correcting field is to linearize the amount of blue droop as represented by curve 96 in FIG. *9c.* That is, the extent of blue droop now becomes a constant M/2 throughout the range of horizontal deflection. Thus, the presence of the additional correcting field results in a uniform or static amount of blue droop throughout the horizontal scan dimensions. To compensate this uniform error, it is necessary only to utilize adjustment of the permanent magnet conventionally included in convergence yoke 35 over the blue beam for the purpose of making a static correction of dynamic convergence. That is, the adjustment for statically correcting dynamic convergence is employed for the purpose of raising dashed line 96 so that it coincides with solid line 93 in FIG. *9c.*

The approach just described in connection with FIGS. *9a–9c* also finds advantageous use in simplifying the employment and operation of the quadrapole-type distortion correction system mentioned in the introduction. In that case, as represented in FIG. 10, the four coils spaced at 90° intervals around the periphery of neck 42 create respective north poles 97 along one diagonal and south poles 98 along the other. Here again, the conventional horizontal dynamic convergence of the glue beam is omitted. It is then only necessary to apply a parabolic current waveform repeating at the horizontal scanning frequency to the quadrapole coils in order to produce a correcting field generally like that depicted by curve 95 in FIG. *9b.* Consequently, the amount of blue beam error once again is linearized as a result of which that error is simply corrected by the same kind of static blue-beam convergence previously suggested.

Whichever of the specifically described approaches is utilized, it is evident that one attainment is that of simplification as compared with prior approaches. At the same time, tolerances are eased in either or both of the manufacture of the luminescent screen with its multiplicity of dot triads or in the manufacture and operation of the electron guns and the systems which control the positioning of the electron beams. In the preferred approach, in which a pair of simple pancake-type printed coils are simply slipped between the neck of the tube and the deflection yoke, there is an obvious savings in both space and expense.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a color television receiver that includes:

a cathode ray tube having an image screen composed of luminescent dot triads distributed in a raster pattern with each triad having dots individually productive of respective red, green and blue colors;

means for producing a triad of three electron beams to excite respectively assigned ones of said dots, two of said beams being aligned in one direction while the other is displaced in the orthogonal direction;

means for developing scanning fields to deflect said beams over said raster pattern to define an image, while introducing astigmatic distortion in said beam triad as said beams are deflected toward edges of said pattern; and means tending to maintain convergence of said beams throughout action of said deflection means;

the improvement comprising:

means, distinct from said means for developing said scanning fields, for subjecting at least said other beam, in a location near the region of said scanning fields, essentially only to a pair of correcting fields within said scanning fields at least near the deflection center of said developing means, said scanning fields, space-opposed on opposite sides of said other beam in said one direction and mutually aiding movement of said other beam in said orthogonal direction, to compensate said astigmatic distortion;

and means for energizing said subjecting means with energy which at least includes a component that varies parabolically in amplitude at the rate of change of said scanning fields in said one direction.

2. A receiver as defined in claim 1 in which the waveform of said energy is phased to effect movement of said other beam in said orthogonal direction an amount which increases as said beams are deflected in said one direction nearer to the side edges of said image screen.

3. A receiver as defined in claim 1 in which said subjecting means includes a pair of pancake shaped coils sandwiched between said developing means and the wall of said cathode ray tube and disposed respectively opposite sides of said other beam and in which each of said coils spans approximately 90° from a point above said other beam to a point laterally to one side of said triad of beams.

4. A receiver as defined in claim 1 in which said subjecting means includes a pair of pancake shaped coils sandwiched between said developing means and the wall of said cathode ray tube and disposed respectively on opposite sides of said other beam and in which each of said coils spans approximately 45° from a point above said other beam.

5. A receiver as defined in claim 1 in which said tending means acts in said one direction directly upon only said two beams, in which said subjecting means linearizes convergence error of said other beam, and which further includes means for statically correcting the linearized convergence error.

6. A receiver as defined in claim 1 in which said correcting fields also aid movement of said two beams in a direction compensatory of said astigmatic distortion.

7. A receiver as defined in claim 1 in which said energy also includes the addition of a component that varies parabolically in amplitude at the rate of change of said scanning fields in said other direction, the relative amplitudes of said components being selected to afford substantially no compensatory effect at the center and at the four corners of said image screen.

* * * * *